United States Patent [19]

Doucette et al.

[11] 3,968,075

[45] July 6, 1976

[54] MOLDING COMPOSITION AND ARTICLES MOLDED THEREFROM

[76] Inventors: Edward I. Doucette, 6290 Sunset Blvd., Suite 414, Los Angeles, Calif. 90053; Robert W. Leiterman, 1618 N. Leafdale, El Monte, Calif. 91734; Wesley C. Thompson, 1102 Charlinda St., West Covina, Calif. 91790

[22] Filed: July 27, 1973

[21] Appl. No.: 383,318

Related U.S. Application Data

[63] Continuation of Ser. No. 801,815, Feb. 24, 1969, abandoned.

[52] U.S. Cl. .................... 260/42.25; 260/33.6 AQ; 260/759; 260/763
[51] Int. Cl.² .......................................... C08K 3/04
[58] Field of Search .................... 260/41.5 R, 42.25

[56] References Cited
UNITED STATES PATENTS 2,883,358    4/1959    Gentry ............................. 260/41.5
3,359,229   12/1967    Chalex ............................. 260/33.6

*Primary Examiner*—Paul R. Michl
*Attorney, Agent, or Firm*—S. Michael Bender; Robert D. Bajefsky

[57] ABSTRACT

Disclosed herein is a molding composition comprising rubber hydrocarbon polymer and a filler of finely divided petroleum coke.

Also disclosed herein is a useful article, such as a battery container or a cover therefor, molded from the composition and having satisfactory chemical properties (including particularly resistance to harsh chemicals such as battery electrolyte) and satisfactory combined physical properties of stiffness (hereinafter called "flexural modulus") and impact strength.

9 Claims, No Drawings

3,968,075

MOLDING COMPOSITION AND ARTICLES MOLDED THEREFROM

This is a continuation of application Ser. No. 801,815 filed Feb. 24, 1969 now abandoned.

BACKGROUND OF THE INVENTION

Useful articles such as battery containers and battery container covers have in the past typically been molded from compositions comprising mixtures of rubber hydrocarbon polymer and a filler consisting of anthracite coal dust. A typical formulation of such a prior art composition is as follows:

Table A

| (Prior Art) | % by Weight |
|---|---|
| Rubber hydrocarbon polymer | 9.021 |
| Filler (anthracite coal dust) | 74.399 |
| Lime (activator) | 4.903 |
| Sulfur | 2.287 |
| Mold release agent | 0.214 |
| Accelerator | 0.543 |
| Oil | 8.633 |
| | 100.000 |

It is noted that in the composition of Table A, the sulfur content is about 25.3% of the rubber hydrocarbon polymer content. The composition of Table A can be said to be a hard rubber molding composition, since the generally accepted definition of a hard rubber molding composition is one in which the sulfur-to-rubber hydrocarbon polymer ratio is greater than 25%.

The lime functions as an activator to activate the rubber for vulcanization. The sulfur functions as a vulcanizing (crosslinking) agent. The mold release agent can be a high molecular weight long chain aliphatic amine of the type offered for sale by Armour & Co. under the trademark ARMEEN. The accelerator can be of the aldehydeamine type, such as that available from Monsanto Company under the designation "A-100", although other accelerators, such as diphenyl-guanidine (DPG), are equivalent to, and could be used in lieu of, A-100. The oil can be petroleum oil which acts as a plasticizer or softener. Other combinations of accelerators, activators and processing agents are also well known and can be used instead of the aforementioned agents to obtain desired cure rates.

It has heretofore been usual to determine whether or not a battery container or battery container cover is satisfactory by measuring hardness and impact strength. A minimum hardness of 63 Shore D has heretofore been considered necessary, in combination with an impact strength of at least 5 units, as defined hereinafter.

Anthracite coal dust is quite expensive. Consequently, many attempts have been made to substitute for anthracite coal dust lower cost filler materials, including specifically finely divided petroleum coke alone and in combination with strengthening agents such as Portland cement, as is suggested in Gentry et al. U.S. Pat. No. 2,883,358 which issued Apr. 21, 1959. Past efforts to substitute finely divided petroleum coke alone for anthracite coal dust have uniformly resulted in molded articles with such inferior physical properties that the articles were unsatisfactory.

More specifically, when finely divided petroleum coke was substituted for anthracite coal dust on a one-for-one basis and then molded under the conditions normally used for coal filled compositions, either the molded article was satisfactory as to flexural modulus but unsatisfactory as to impact strength, or else the material became completely degraded as the result of an overcure condition.

SUMMARY OF THE INVENTION

The present invention sets forth a molding composition comprising rubber hydrocarbon polymer, the composition utilizing finely divided petroleum coke as a filler, which composition can be molded to produce a useful article such as a battery container or a battery container cover having critical physical properties of flexural modulus and impact strength, as well as being resistant to certain harsh chemicals such as particularly battery electrolyte.

Accordingly, important objects of the invention are to provide: a molding composition comprising rubber hydrocarbon polymer and a filler of finely divided petroleum coke; and a useful article, such as (without limitation) a battery container or a battery container cover, molded from the composition and having satisfactory chemical and physical properties.

DESCRIPTION OF THE INVENTION

As used herein, impact strength is measured by dropping a 2-pound steel ball from increasing heights onto the center of a 4-inch square specimen which is ⅛ inch thick, the specimen being centrally supported on a ring having an inside diameter of 3 inches. An impact strength of 5 units, for example, means that the specimen will not fracture when the ball is dropped from a height of at least 5 inches. An impact strength of 6 units means that the specimen will not fracture when the ball is dropped from a height of at least 6 inches.

As usual herein, flexural modulus is measured by applying deforming force to a specimen 0.225 inch thick, 1 inch wide and 12 inches long and observing the amount of force necessary to produce a deformation of 0.1 inch. The deforming force is centrally applied to a 10 inch span of the specimen. If a force of 5 pounds is required to produce a deformation of 0.1 inch, the specimen is said to have a flexural modulus of 5 units. If a force of 3 pounds produces a deformation of 0.1 inch, the specimen has a flexural modulus of 3 units.

As used herein, the term "finely divided petroleum coke" typically means a standard sieve analysis of 95 to 98% through a 200 mesh screen and 85 to 92% through a 325 mesh screen.

During the investigation which led to the present invention, it was discovered that prior art compositions containing a filler of finely divided petroleum coke cure faster than do compositions containing a filler of anthracite coal dust. That is, such coke filled compositions achieve higher hardnesses earlier in the molding cycle than do coal filled compositions. The rapid curing of prior art coke filled compositions often resulted in overcuring and degradation of physical properties.

It was also discovered during the investigation that for any given Shore D hardness, coke filled compositions are superior to coal filled compositions as to flexural modulus, and, in fact, whereas 63 Shore D is a satisfactory minimum hardness for coal filled compositions, for coke filled compounds, the minimum hardness level needs to be only about 59 Shore D. The significance of hardness is that it is quickly measurable and is related to flexural modulus, that relationship, however, being different for coal filled compositions and coke filled compositions.

However, even making allowances for the reduced minimum hardness found to be applicable to coke filled compositions, the heretofore tested coke filled compositions yielded unsatisfactory results, as aforesaid.

It was discovered that if measures were taken to reduce the rate of cure of coke filled compositions and/or to reduce the degree of vulcanization which can occur, then both the impact strength and the flexural modulus of the resulting molded articles could be substantially improved.

The following Example I of a molding composition in accordance with the invention was found to result in improving both the impact strength and the flexural modulus of battery containers and battery container covers molded therefrom:

Example I

|  | % by Weight |
| --- | --- |
| Rubber hydrocarbon polymer | 9.021 |
| Filler (finely divided petroleum coke) | 75.185 |
| Lime (activator) | 4.903 |
| Sulfur | 1.144 |
| Mold release agent | 0.214 |
| Accelerator | 0.272 |
| Oil | 8.633 |
|  | 100.000 |

It is to be noted that, relative to the prior art composition of Table A, in the composition of Example I the sulfur content has been reduced from 25.3% to about 12.7% of the rubber hydrocarbon polymer content and the accelerator content of the composition has been reduced from 0.543 to 0.272%. The accelerator content reduction decreases the rate of cure for similar molding conditions and thus prevents the possibility of overcuring and the reduction in the ratio of sulfur to rubber hydrocarbon polymer reduces the degree of vulcanization which can occur and thus limits the hardness of the resulting molded article.

When the composition of Example I was molded and cured under pressure at the usual rubber curing temperature of about 370°F. for from 5 to 10 minutes, to form battery containers and battery container covers, it was found that those battery containers and battery container covers exhibited substantially improved combined properties of flexural modulus and impact strength with respect to articles molded from the composition of Table A but wherein a one-for-one substitution of coke for coal was made. More specifically, the battery containers and the battery container covers so produced from the composition of Example I had at the same time a flexural modulus in excess of 5 units and an impact strength in excess of 5 units and were of completely unsatisfactory commercial quality. The hardness of the battery containers and the battery container covers molded from the composition of Example I ranged from about 59 Shore D for the shorter molding cycles to about 65 Shore D for the longer molding cycles.

In many geographical areas, anthracite coal dust costs more than twice as much as finely divided petroleum coke. Furthermore, coke filled compositions have a density or pound-volume advantage of about 5% as compared to traditional coal filled compositions.

The drastic cost reduction which can be realized by following the foregoing teachings makes possible a further dramatic improvement, in that a small increase in rubber hydrocarbon polymer content can economically be made, i.e., from about 9 by weight to about 11%, as in the following Example II, of a composition embodying the invention:

Example II

|  | % by Weight |
| --- | --- |
| Rubber hydrocarbon polymer | 10.71 |
| Filler (finely divided petroleum coke) | 69.63 |
| Lime (activator) | 5.84 |
| Sulfur | 2.12 |
| Mold release agent | 0.25 |
| Accelerator | 0.26 |
| Oil | 11.19 |
|  | 100.00 |

In the composition of Example II the sulfur content is about 19.8% of the rubber hydrocarbon polymer content.

The following Example III of a molding composition embodying the invention also utilizes about 11% rubber hydrocarbon polymer:

Example III

|  | % by Weight |
| --- | --- |
| Rubber hydrocarbon polymer | 11.168 |
| Filler (finely petroleum coke) | 72.148 |
| Lime (activator) | 5.719 |
| Sulfur | 2.383 |
| Mold release agent | 0.271 |
| Accelerator | 0.346 |
| Oil | 7.965 |
|  | 100.000 |

In the composition of Example III the sulfur content is about 21.4% of the rubber hydrocarbon polymer content.

It was found that when a battery container or a battery container cover was molded from the composition of Example II or the composition of Example III under the conditions aforesaid for the composition of Example I, the resulting battery container or battery container cover had properties of flexural modulus and impact strength superior to those properties obtainable with coal filled compositions.

It has been found that satisfactory results can be obtained with coke filled compositions in which the sulfur content is substantially less than 25% of the rubber hydrocarbon polymer content and is preferably in the range from about 12 to about 22% of the rubber hydrocarbon polymer content.

It has further been found that satisfactory results can be obtained with coke filled compositions in which the accelerator content is substantially less than 0.54% and is preferably not greater than about 0.35%.

It has also been found that by following the teachings of the present invention, the rubber hydrocarbon content of the composition can be as low as about 8%.

The filler content of the composition is not critical and can be as low as 50%, accompanied in the latter instance by an increase in rubber hydrocarbon polymer content to about 15 to 25%.

It is also noted that the compositions of Examples I, II and III are not hard rubber molding compositions.

The compositions of Table A and Examples I, II and II were prepared using normal commercial mixing techniques in a Banbury mixer and the rubber hydrocarbon polymer can be a plurality of natural rubbers and compatible synthetic rubbers blended together, as taught by Gentry et al. U.S. Pat. No. 2,883,358. Also, the molding process can be any of the commonly used types, such as compression or injection.

The foregoing examples of the invention are not to be construed as limitations on the invention, the same being defined by the appended claims.

What is claimed is:

1. A curable composition for producing a battery container or cover therefor having improved combined properties of surface hardness, impact strength, and flexural modulus, said composition consisting essentially of a mixture of:

rubber hydrocarbon polymer selected from the class consisting of natural rubber, copolymers of butadiene styrene or butadiene acrylonitrile, or compatible mixtures of natural rubber and/or said copolymers, the content of said rubber hydrocarbon polymer being about 9% of the composition by weight;

a filler consisting of finely divided petroleum coke, said filler making up about 75% of the composition by weight;

sulfur in an amount by weight being about 13% of the rubber hydrocarbon polymer content;

an accelerator making up about 0.27% of the composition by weight;

the remainder of the composition being made up of suitable quantities of activator and plasticizer.

2. A curable composition for producing a battery container or cover therefor having improved combined properties of surface hardness, impact strength, and flexural modulus, said composition consisting essentially of a mixture of:

rubber hydrocarbon polymer selected from the class consisting of natural rubber, copolymers of butadiene styrene or butadiene acrylonitrile, or compatible mixtures of natural rubber and/or said copolymers, the content of said rubber hydrocarbon polymer ranging from about 10.5 to about 11.5% by weight of the composition;

a filler consisting of finely divided petroleum coke, said filler making up from about 65 to about 75% of the weight of the composition;

sulfur in the amount by weight ranging from about 19 to about 22% of the rubber hydrocarbon polymer content;

an accelerator in the range from about 0.25 to about 0.35% of the composition by weight;

the remainder of the composition being made up of suitable quantities of activator and plasticizer.

3. The method of producing a battery container or cover therefor having improved combined properties of surface hardness, impact strength, and flexural modulus comprising the steps of forming a curable composition consisting essentially of the following mixture:

a. rubber hydrocarbon polymer selected from the class consisting of natural rubber, copolymers of butadiene styrene or butadiene acrylonitrile, or compatible mixtures of natural rubber and/or said copolymers, the content of said rubber hydrocarbon polymer ranging from about 8 to about 25% by weight of the composition;

b. a filler consisting of finely divided petroleum coke, said filler making up from about 65 to about 75% of the weight of the composition;

c. sulfur in an amount by weight ranging from about 12 to about 22% of the rubber hydrocarbon polymer content;

d. an accelerator in an amount by weight ranging from about .25 to about .35% by weight of the composition;

e. suitable quantities of activator and plasticizer;

and molding said composition under heat and pressure to form said battery container or cover therefor.

4. The cured molded battery container or cover therefor of claim 3.

5. The invention of claim 4 wherein the battery container or cover therefor has a hardness of about 59 Shore D, an impact strength of at least 5 units, and a flexural modulus of at least 5 units.

6. A curable composition for producing a battery container or cover therefor having improved combined properties of surface hardness, impact strength and flexural modulus, said composition consisting essentially of a mixture of:

rubber hydrocarbon polymer selected from the class consisting of natural rubber, copolymers of butadiene styrene or butadiene acrylonitrile, or compatible mixtures of natural rubber and/or said copolymers; the content of said rubber hydrocarbon polymer being about 8–25% by weight of the composition; a filler consisting of finely divided petroleum coke making up from about 65–75% of the weight of the composition; sulfur in an amount by weight ranging from about 12–22% of the rubber hydrocarbon content; and an accelerator in an amount ranging from about .25–.35% of the composition by weight; the remainder of the composition being made up of suitable quantities of activator and plasticizer.

7. A battery container or cover therefor molded from the curable composition of claim 6.

8. The invention defined in claim 6 wherein said accelerator is of the aldehyde-amine type or diphenylguanidine.

9. The invention defined in claim 6 wherein about 95% of said finely divided petroleum coke passes through a 200 mesh screen and about 85% through a 325 mesh screen.